(12) United States Patent
Kobayashi

(10) Patent No.: US 10,746,087 B2
(45) Date of Patent: Aug. 18, 2020

(54) VEHICLE FRONT STRUCTURE

(71) Applicant: TOYOTA JIDOSHA KABUSHIKI KAISHA, Toyota-shi, Aichi-ken (JP)

(72) Inventor: Tomokazu Kobayashi, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/548,088

(22) Filed: Aug. 22, 2019

(65) Prior Publication Data

US 2020/0095919 A1 Mar. 26, 2020

(30) Foreign Application Priority Data

Sep. 25, 2018 (JP) .................. 2018-178547

(51) Int. Cl.
*F01P 11/10* (2006.01)
*B60K 13/02* (2006.01)
*B60K 11/08* (2006.01)

(52) U.S. Cl.
CPC .............. *F01P 11/10* (2013.01); *B60K 11/08* (2013.01); *B60K 13/02* (2013.01); *F01P 2060/02* (2013.01)

(58) Field of Classification Search
CPC ..... B60K 13/02; B60K 13/06; F02B 29/0475; F02B 29/04; F02M 35/048; F02M 35/10354; F02M 35/104; F02M 35/10288; F02M 35/10321; F02M 35/10; F02M 35/10242
See application file for complete search history.

(56) References Cited

U.S. PATENT DOCUMENTS

| | | | |
|---|---|---|---|
| 2005/0139198 A1* | 6/2005 | Park ................. | F02M 35/10288 123/563 |
| 2005/0235942 A1* | 10/2005 | McCullagh ...... | F02M 35/10288 123/184.34 |
| 2006/0086548 A1 | 4/2006 | Muramatsu et al. | |
| 2011/0062750 A1* | 3/2011 | Nakaura ................. | B60R 19/12 296/187.09 |
| 2014/0311142 A1* | 10/2014 | Speidel ............... | F02B 29/0462 60/599 |
| 2014/0326222 A1* | 11/2014 | Hummel ............. | F02B 29/0443 123/542 |
| 2019/0128221 A1* | 5/2019 | Tiramani ................ | F01N 13/10 |

FOREIGN PATENT DOCUMENTS

JP 2006-103608 A 4/2006

* cited by examiner

*Primary Examiner* — Long T Tran
(74) *Attorney, Agent, or Firm* — Oliff PLC

(57) ABSTRACT

An intercooler is coupled to an internal combustion engine by a first bracket extending from the intercooler. A grommet is fitted into an attachment hole of the first bracket. The grommet is made of synthetic rubber. A material of the grommet has a lower Young's modulus than a material of the first bracket. The first bracket is coupled to a second head cover and a second cylinder head by the grommet, an upper bolt, and a lower bolt.

5 Claims, 3 Drawing Sheets

VEHICLE FRONT STRUCTURE

BACKGROUND

1. Field

The following description relates to a vehicle front structure.

2. Description of Related Art

Japanese Laid-Open Patent Publication No. 2006-103608 discloses an intercooler for cooling intake air that has been forcibly delivered by a forced-induction device. The intercooler is located above the internal combustion engine and below the hood in the engine compartment. Further, the intercooler is fixed to a duct through which the intercooler is supplied with ambient air.

When an object collides with the hood of the vehicle from above, the hood is bent or deformed downward, thereby absorbing the impact force produced through the object's collision. Thus, to absorb the impact force from above, it is preferred that a sufficient crushable zone be provided above the internal combustion engine in the engine compartment. However, when the intercooler is arranged above the internal combustion engine as described in the document, it is difficult to provide a crushable zone between the internal combustion engine and the hood. Thus, in some cases, the impact absorption force acting on impact from above is small.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above-described problem, according to a first aspect of the present disclosure, a vehicle front structure in which an intercooler for cooling intake air is arranged above an internal combustion engine in an engine compartment is provided. The vehicle front structure includes an attachment body extending from the intercooler and an elastic member arranged between the attachment body and the internal combustion engine. The intercooler is coupled to the internal combustion engine by the attachment body. A material of the elastic member has a lower Young's modulus than a material of the attachment body.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle front structure according to the present disclosure will now be described. An internal combustion engine 10 is installed in a vehicle. The vertical direction of the vehicle is defined as the vertical direction of the internal combustion engine 10.

First, the schematic configuration of the internal combustion engine 10 and its peripheral structure will be described.

Figure 1:
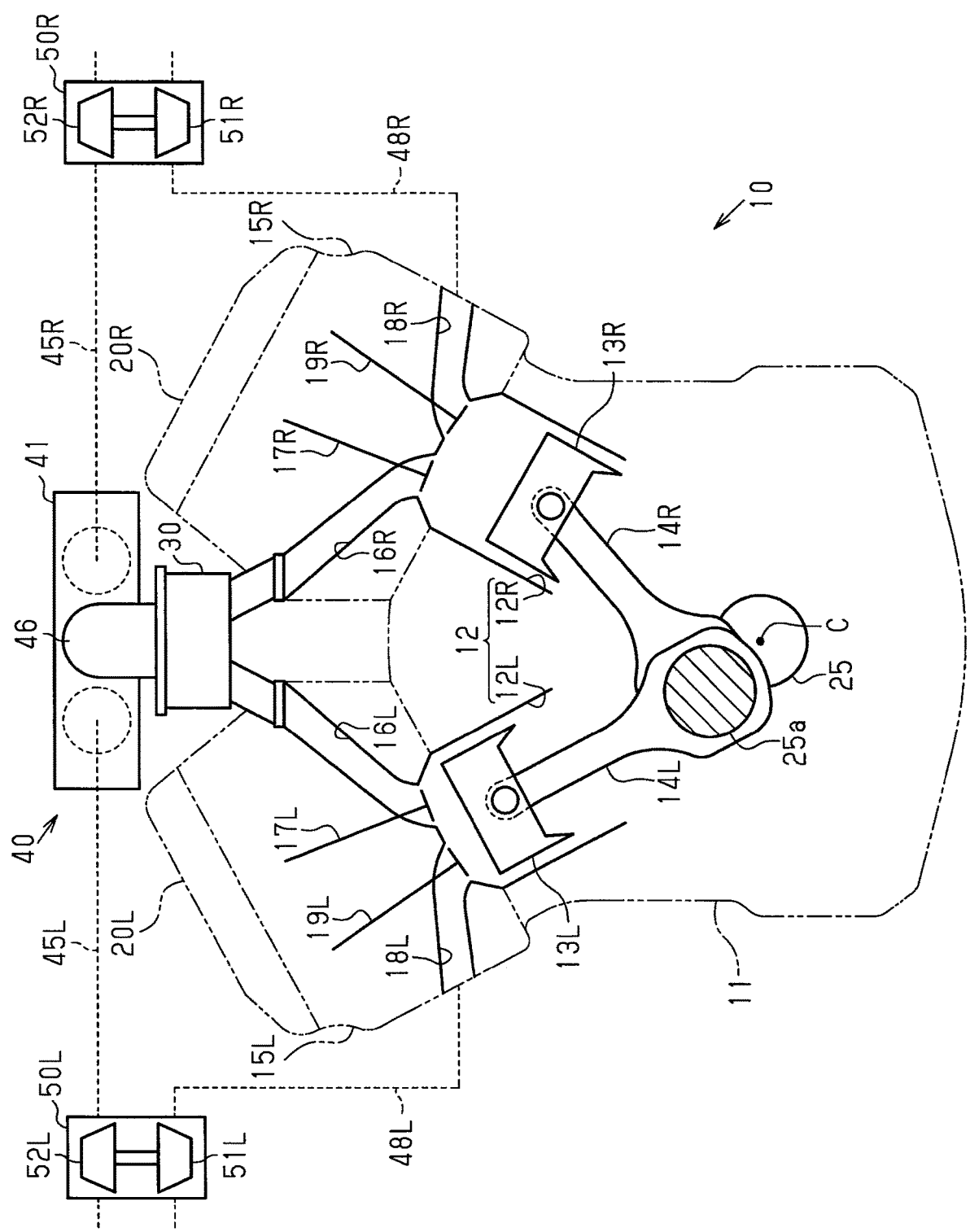
FIG. 1 is a diagram schematically showing the configuration of a vehicle front structure.

As shown in FIG. 1, the internal combustion engine 10 includes a cylinder block 11, which includes six cylinders 12 (only two cylinders are shown in FIG. 1). Three of the six cylinders 12 are aligned on the left side of a rotational axis C of a crankshaft 25 to configure cylinders 12L in a first bank (fist bank cylinders 12L). The remaining three cylinders 12 are aligned on the right side of the rotational axis C of the crankshaft 25 to configure cylinders 12R in a second bank (second bank cylinders 12R). The first bank cylinders 12L and the second bank cylinders 12R are inclined such that the first bank cylinders 12L and the second bank cylinders 12R are closer to each other toward the crankshaft 25. That is, the first bank cylinders 12L and the second bank cylinders 12R are laid out to configure a V-shaped arrangement.

Each first bank cylinder 12L includes a piston 13L, which is movable back and forth in the cylinder 12L. The piston 13L is connected by a connecting rod 14L to a crank pin 25a of the crankshaft 25. In the same manner, each second bank cylinder 12R includes a piston 13R, which is movable back and forth in the cylinder 12R. The piston 13R is coupled by a connecting rod 14R to the crank pin 25a. Reciprocation of the piston 13L, which is arranged in the first bank, and the piston 13R, which is arranged in the second bank, rotates the crankshaft 25 with respect to the rotational axis C.

A first cylinder head 15L is coupled to the upper part of the cylinder block 11 so as to face the first bank cylinders 12L. The first cylinder head 15L includes an intake port 16L, through which each first bank cylinder 12L is supplied with intake air. The first cylinder head 15L includes three intake ports 16L in correspondence with the first bank cylinders 12L. Further, the first cylinder head 15L includes an intake valve 17L, which opens and closes an opening of the intake port 16L in the vicinity of each cylinder 12L.

The first cylinder head 15L includes an exhaust port 18L, through which exhaust gas is discharged from each first bank cylinder 12L. The first cylinder head 15L includes three exhaust ports 18L in correspondence with the first bank cylinders 12L. Each exhaust port 18L is connected to a first exhaust passage 48L, through which exhaust air discharged from the exhaust port 18L flows. The first exhaust passage 48L is configured by, for example, an exhaust manifold that causes exhaust gas from each exhaust port 18L to merge and an exhaust pipe connected to the exhaust manifold. Further, the first cylinder head 15L includes an exhaust valve 19L, which opens and closes an opening of the exhaust port 18L in the vicinity of each cylinder 12L. In FIG. 1, the first exhaust passage 48L is schematically shown by a broken line.

A first head cover 20L, which covers the first cylinder head 15L from above, is coupled to the upper part of the first cylinder head 15L. Although not illustrated in the drawings, a cam mechanism (valve actuation mechanism) that causes the intake valves 17L and the exhaust valves 19L to open and close is stored in the space between the first head cover 20L and the first cylinder head 15L.

A second cylinder head 15R is coupled to the upper part of the cylinder block 11 so as to face the second bank cylinder 12R. The second cylinder head 15R includes an intake port 16R, through which each second bank cylinder 12R is supplied with intake air. The second cylinder head 15R includes three intake ports 16R in correspondence with the second bank cylinders 12R. Further, the second cylinder head 15R includes an intake valve 17R, which opens and closes an opening of the intake port 16R in the vicinity of each cylinder 12R.

The second cylinder head 15R includes an exhaust port 18R, through which exhaust gas is discharged from each second bank cylinder 12R. The second cylinder head 15R includes three exhaust ports 18R in correspondence with each second bank cylinder 12R. Each exhaust port 18R is connected to a second exhaust passage 48R, through which exhaust air discharged from the exhaust port 18R flows. The second exhaust passage 48R is configured by, for example, an exhaust manifold that causes exhaust gas from each exhaust port 18R to merge and an exhaust pipe connected to the exhaust manifold. Further, the second cylinder head 15R includes an exhaust valve 19R, which opens and closes an opening of the exhaust port 18R in the vicinity of each cylinder 12R. In FIG. 1, the second exhaust passage 48R is schematically shown by a broken line.

A second head cover 20R, which covers the second cylinder head 15R from above, is coupled to the upper part of the second cylinder head 15R. Although not illustrated in the drawings, a cam mechanism (valve actuation mechanism) for causing the intake valves 17R and the exhaust valves 19R to open and close is stored in the space between the second head cover 20R and the second cylinder head 15R.

An intake manifold 30, through which intake air (ambient air) from the vehicle exterior is drawn into the intake ports 16L and the intake ports 16R, is arranged between the first cylinder head 15L and the second cylinder head 15R. The downstream part of the intake manifold 30 bifurcates into two parts. One of the bifurcated parts of the intake manifold 30 is connected to the first bank intake ports 16L, and the other one is connected to the second bank intake ports 16R.

A water-cooling intercooler 40, which cools intake air, is arranged above the intake manifold 30. A hood (not shown) is arranged on the upper side of the intercooler 40 to close the engine compartment from above. That is, the intercooler 40 is arranged above the internal combustion engine 10 in the engine compartment.

Figure 2:
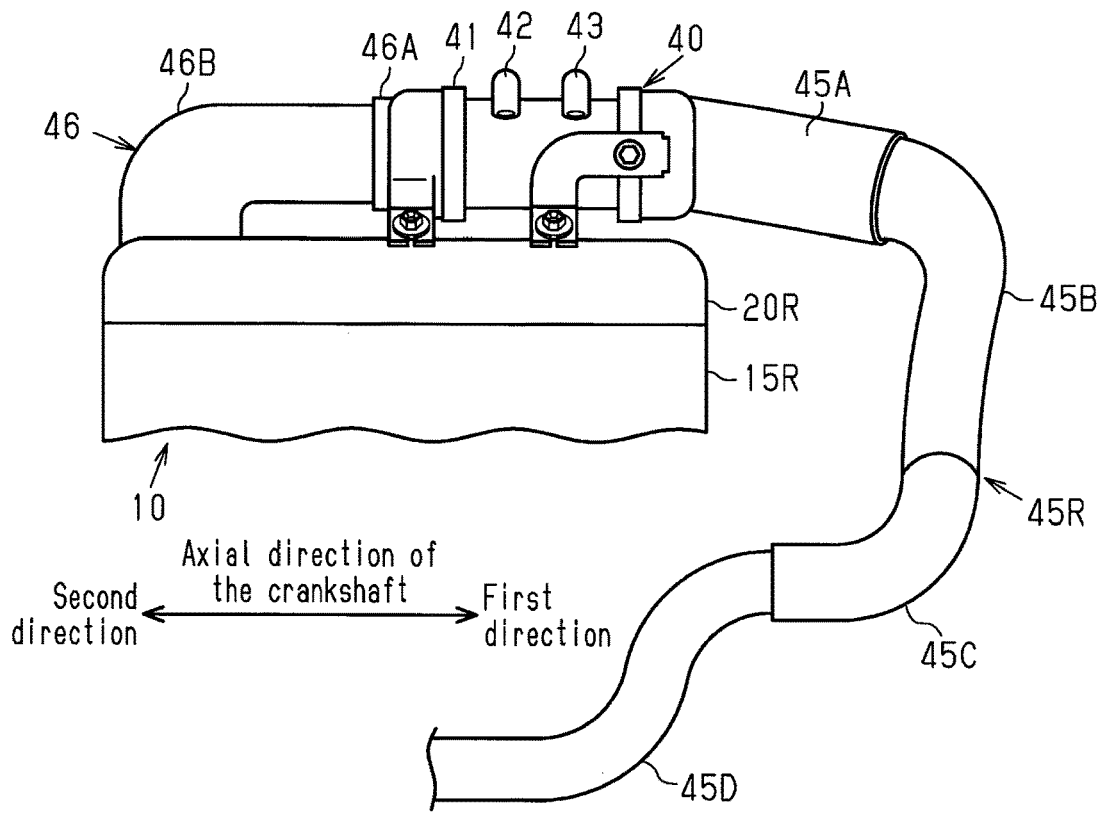
FIG. 2 is a partial side view showing the vehicle front structure.
Figure 3:
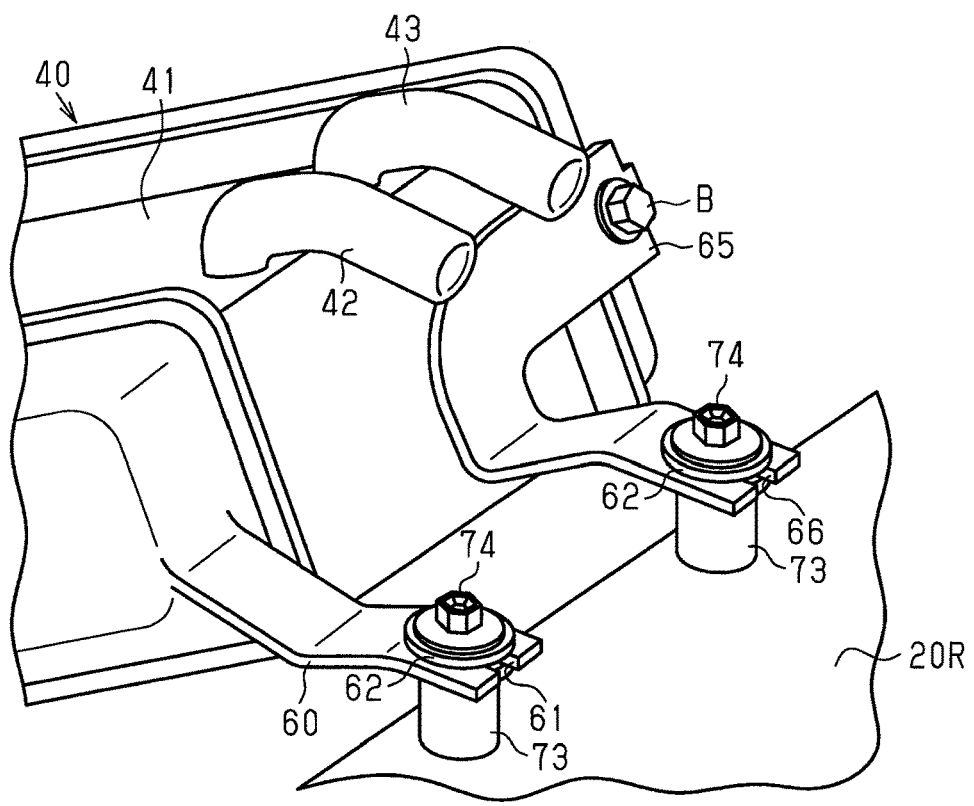
FIG. 3 is a perspective view showing where the internal combustion engine and the intercooler are fixed to each other.

As shown in FIGS. 2 and 3, the intercooler 40 includes a body 41, which has the form of a rectangular parallelepiped. A tubular coolant inlet 42 protrudes from the body 41.

Further, a tubular coolant outlet 43 protrudes from the body 41. A coolant passage (not shown) extends throughout the body 41. Coolant drawn from the coolant inlet 42 flows through the coolant passage and is discharged from the coolant outlet 43. In this embodiment, the coolant inlet 42 and the coolant outlet 43 are aligned at the body 41 on the second bank.

As shown in FIG. 1, a first upstream intake pipe 45L and a second upstream intake pipe 45R extend from the ends of the body 41 in the axial direction of the crankshaft 25, that is, the ends located at the back of the sheet of FIG. 1 (right end of FIG. 2). The first upstream intake pipe 45L is located closer to the first bank than to the rotational axis C of the crankshaft 25. The second upstream intake pipe 45R is located closer to the second bank than to the rotational axis C of the crankshaft 25. In FIG. 1, the sections of the body 41 connected to the first upstream intake pipe 45L and the second upstream intake pipe 45R are schematically shown by broken lines, and the first upstream intake pipe 45L and the second upstream intake pipe 45R are schematically shown by broken lines.

As shown in FIG. 2, the second upstream intake pipe 45R extends from the body 41 of the intercooler 40 in a first direction corresponding to the axial direction of the crankshaft 25, further extends downward, and then extends in a second direction, which is opposite to the first direction. That is, the entire second upstream intake pipe 45R extends in a U-shaped manner. FIG. 2 does not show the upstream side of the second upstream intake pipe 45R in the intake air flow direction, that is, the portion of the second upstream intake pipe 45R located on the side opposite from the intercooler 40.

The second upstream intake pipe 45R includes, sequentially from a pipe closer to the intercooler 40, a downstream pipe 45A, a middle downstream pipe 45B, a middle upstream pipe 45C, and an upstream pipe 45D. The downstream pipe 45A is connected to the intercooler 40. The downstream pipe 45A configures a portion of the second upstream intake pipe 45R extending in the first direction corresponding to the axial direction of the crankshaft 25. The downstream pipe 45A is made of synthetic rubber. The middle downstream pipe 45B is connected to the downstream pipe 45A. The middle downstream pipe 45B configures a portion of the second upstream intake pipe 45R extending substantially in the vertical direction. The middle downstream pipe 45B is made of steel, for example, stainless steel.

The middle upstream pipe 45C is connected to the middle downstream pipe 45B. The middle upstream pipe 45C configures a portion of the second upstream intake pipe 45R curved in the second direction. The middle upstream pipe 45C is made of synthetic plastic. The upstream pipe 45D is connected to the middle upstream pipe 45C. The upstream pipe 45D configures a portion of the second upstream intake pipe 45R located upstream of the middle upstream pipe 45C in the intake air flow direction, The first upstream intake pipe 45L extends on the first bank in the same manner as the second upstream intake pipe 45R. The first upstream intake pipe 45L includes a downstream pipe 45A, a middle downstream pipe 45B, a middle upstream pipe 45C, and a upstream pipe 45D in the same manner as the second upstream intake pipe 45R.

As shown in FIG. 1, a downstream intake pipe 46 extends from the end of the body 41 in the axial direction of the crankshaft 25, that is, the end located at the front of the sheet of FIG. 1 (left end of FIG. 2). As shown in FIGS. 1 and 2, the downstream intake pipe 46 extends from the body 41 in the second direction corresponding to the axial direction of the crankshaft 25, further extends downward, and is connected to the intake manifold 30.

The downstream intake pipe 46 includes, sequentially from a pipe closer to the intercooler 40, an upstream pipe 46A and a downstream pipe 46B. The upstream pipe 46A is connected to the intercooler 40 and configures a part of the upstream side of the downstream intake pipe 46. The upstream pipe 46A is made of steel, for example, stainless steel. The downstream pipe 46B connects the upstream pipe 46A to the intake manifold 30. That is, the downstream pipe 46B configures a part of the downstream side of the downstream intake pipe 46. The downstream pipe 46B is made of synthetic plastic.

As shown in FIG. 1, a first turbocharger 50L is coupled to the first exhaust passage 48L, which extends from the exhaust port 18L on the first bank, and to the first upstream intake pipe 45L, which extends from the intercooler 40, such that the first turbocharger 50L extends over the first exhaust passage 48L and the first upstream intake pipe 45L. The first turbocharger 50L includes a turbine wheel 51L, which is rotated by the flow of exhaust gas of the first exhaust passage 48L. The first turbocharger 50L further includes a compressor wheel 52L, which rotates integrally with the turbine wheel 51L. The first turbocharger 50L is fixed to the cylinder block 11 by, for example, bolts.

A second turbocharger 50R is coupled to the second exhaust passage 48R, which extends from the exhaust port 18R on the second bank, and to the second upstream intake pipe 45R, which extends from the intercooler 40, such that the second turbocharger 50R extends over the second exhaust passage 48R and the second upstream intake pipe 45R. The second turbocharger 50R includes a turbine wheel 51R, which is rotated by the flow of exhaust gas of the second exhaust passage 48R. The second turbocharger 50R further includes a compressor wheel 52R, which rotates integrally with the turbine wheel 51R. The second turbocharger 50R is fixed to the cylinder block 11 by, for example, bolts.

When the internal combustion engine 10 is driven, exhaust gas is discharged from the exhaust port 18L on the first bank to the first exhaust passage 48L. This rotates the turbine wheel 51L of the first turbocharger 50L. As a result, the compressor wheel 52L of the first turbocharger 50L rotates, thereby forcibly delivering intake air into the intercooler 40. In the same manner, the compressor wheel 52R of the second turbocharger 50R rotates, thereby forcibly delivering intake air toward the intercooler 40. The intake air compressed by the first turbocharger 50L and the second turbocharger 50R to become high in temperature is cooled in the intercooler 40 and then supplied to the cylinders 12 through the intake manifold 30.

The structure for coupling the intercooler 40 to the internal combustion engine 10 will now be described. The structure for coupling the intercooler 40 to the first bank of the internal combustion engine 10 is the same as the structure for coupling the intercooler 40 to the second bank of the internal combustion engine 10. Thus, only the structure for coupling the intercooler 40 to the second bank will be described below.

As shown in FIG. 3, a first bracket 60, which has the form of a rectangular plate, extends from the side surface of the intercooler 40 on the second bank. The first bracket 60 extends toward the upper surface of the second head cover 20R from the side surface of the intercooler 40 on the second bank. The distal portion of the first bracket 60 has an attachment hole 61, which extends through the first bracket 60 in the thickness direction of the first bracket 60. The attachment hole 61 has the form of a groove extending in the longitudinal direction of the first bracket 60 and opens in the edge of the distal portion of the first bracket 60. That is, the distal portion of the first bracket 60 is bifurcated into two by the attachment hole 61. The first bracket 60 is made of steel, for example, stainless steel.

Figure 4:
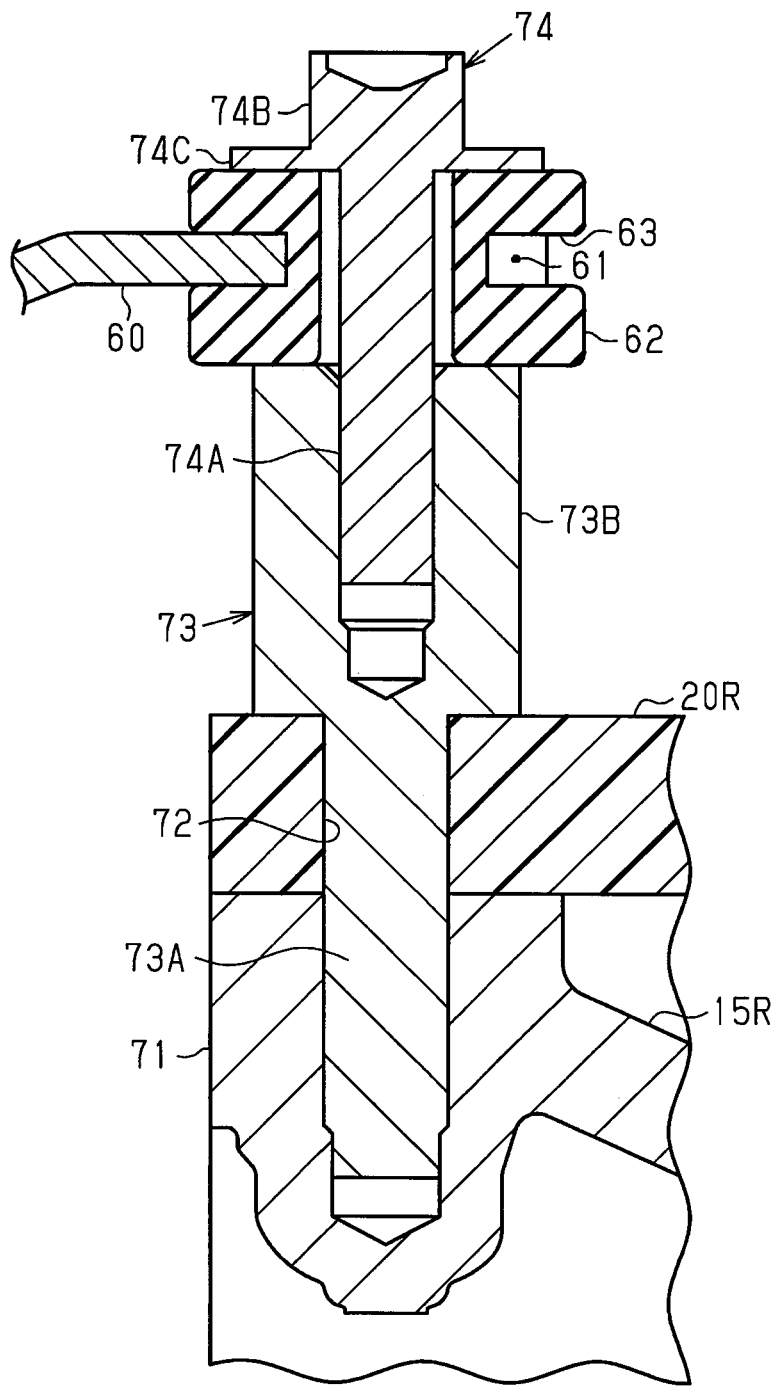
FIG. 4 is a cross-sectional view showing where the internal combustion engine and the intercooler are fixed to each other.

As shown in FIG. 4, an annular grommet 62 is coupled to the attachment hole 61 of the first bracket 60. The outer diameter of the grommet 62 is larger than the dimension of the attachment hole 61 of the first bracket 60 in the lateral direction, that is, larger than the groove width of the attachment hole 61. The inner diameter of the grommet 62 is smaller than the dimension of the attachment hole 61 in the lateral direction.

The outer circumferential surface of the grommet 62 has a groove 63, which is recessed inward in the radial direction. The groove 63 extends entirely in the circumferential direction of the grommet 62. The diameter of the bottom surface of the groove 63, that is, the diameter of the inner surface of the groove 63 in the radial direction, is substantially the same as the dimension of the attachment hole 61 in the lateral direction. The material of the grommet 62 has a smaller Young's modulus than the material of the first bracket 60. The grommet 62 is made of synthetic rubber. That is, the grommet 62 serves as an elastic member.

The inner edge of the attachment hole 61 is located in the groove 63. In other words, the grommet 62 is fitted into the attachment hole 61 of the first bracket 60. In this embodiment, the grommet 62 is fitted into the attachment hole 61 from the distal side of the first bracket 60 to be coupled to the first bracket 60.

The edge of the second cylinder head 15R has a boss 71, which is substantially tubular. The inner circumferential surface of the boss 71 is threaded. FIG. 4 does not show the thread of the boss 71. The second head cover 20R is placed on the upper surface of the second cylinder head 15R. The edge of the second head cover 20R has a bolt hole 72, which extends through the second head cover 20R. The second head cover 20R is positioned relative to the second cylinder head 15R such that the bolt hole 72 overlaps the hole of the boss 71.

A lower bolt 73 is inserted through the bolt hole 72 of the second head cover 20R and the boss 71 of the second cylinder head 15R. Thus, the lower bolt 73 fixes the second head cover 20R to the second cylinder head 15R.

The lower bolt 73 has a cylindrical shaft 73A, which is fastened into the boss 71 of the second cylinder head 15R. The dimension of the shaft 73A in the axial direction is larger than the thickness of the second head cover 20R. Thus, the shaft 73A extends through the bolt hole 72 of the second head cover 20R. The outer diameter of the shaft 73A is substantially the same as the inner diameter of the boss 71 of the second cylinder head 15R. The outer circumferential surface of the shaft 73A is threaded. The distal portion of the shaft 73A, that is, the lower part of the shaft 73A, is fastened to the boss 71 of the second cylinder head 15R. FIG. 4 does not show the thread of the shaft 73A.

The basal portion of the shaft 73A, that is, the upper part of the shaft 73A, defines a head 73B. The head 73B has a larger outer diameter than the shaft 73A. The entire head 73B is tubular. The outer diameter of the head 73B is larger than the inner diameter of the bolt hole 72 of the second head cover 20R. Thus, the second head cover 20R is held and fixed between the lower end of the head 73B and the upper surface of the second cylinder head 15R with the lower bolt 73 fastened into the boss 71 of the second cylinder head 15R.

The head 73B has a slightly smaller inner diameter than the grommet 62. The inner circumferential surface of the head 73B is threaded. That is, the head 73B serves also as a boss for other bolts. FIG. 4 does not show the thread of the head 73B.

The first bracket 60, to which the grommet 62 is coupled, is placed on the upper end surface of the head 73B of the lower bolt 73. The grommet 62 is arranged such that the center hole of the grommet 62 overlaps the center hole of the head 73B of the lower bolt 73.

An upper bolt 74 is inserted through the center hole of the grommet 62 and the center hole of the head 73B of the lower bolt 73. Thus, the upper bolt 74 fixes the first bracket 60 and the grommet 62 to the lower bolt 73. Further, the intercooler 40 is fixed to the second head cover 20R and the second cylinder head 15R by the first bracket 60, the grommet 62, the upper bolt 74, and the lower bolt 73.

The upper bolt 74 includes a cylindrical shaft 74A, which is fastened into the center hole of the head 73B of the lower bolt 73. The dimension of the shaft 74A in the axial direction is larger than the dimension of the grommet 62 in the central axis. Thus, the shaft 74A extends through the center hole of the grommet 62. The outer diameter of the shaft 74A is substantially the same as the inner diameter of the head 73B of the lower bolt 73. The outer circumferential surface of the shaft 74A is threaded. The distal portion of the shaft 74A, that is, a part of the lower side of the shaft 74A, is fastened to the head 73B of the lower bolt 73. FIG. 4 does not show the thread of the shaft 74A.

The basal portion of the shaft 74A, that is, the upper part of the shaft 74A, defines a head 74B. The head 74B has a larger outer diameter than the shaft 74A. The entire head 74B is cylindrical. A flange 74C protrudes outward in the radial direction from the outer circumferential surface of the head 74B. The flange 74C is located at the portion of the head 74B closest to the shaft 74A. The flange 74C extends entirely in the circumferential direction of the head 74B. The outer diameter of the flange 74C is larger than the inner diameter of the grommet 62. Thus, the grommet 62 is held and fixed between the lower surface of the flange 74C of the upper bolt 74 and the upper surface of the head 73B of the lower bolt 73 with the upper bolt 74 fastened to the head 73B of the lower bolt 73.

As shown in FIG. 3, a second bracket 65, which has the form of a strip plate, extends from the side surface of the intercooler 40 on the second bank. The basal portion of the second bracket 65 is fixed to the intercooler 40 at a position deviated from the first bracket 60 in the first direction corresponding to the axial direction of the crankshaft 25, that is, on the right upper side of the first bracket 60. In this embodiment, the second bracket 65 is fixed to the intercooler 40 using a bolt B. The second bracket 65 extends from where the second bracket 65 is fixed to the intercooler 40 toward the first bracket 60 along the side surface of the intercooler 40 and further extends toward the upper surface of the second head cover 20R. The distal portion of the second bracket 65 has an attachment hole 66, which extends through the second bracket 65 in the thickness direction of the second bracket 65. The attachment hole 66 has the form of a groove extending in the longitudinal direction of the second bracket 65 and opens in the edge of the distal portion of the second bracket 65. That is, the distal portion of the second bracket 65 is bifurcated into two by the attachment hole 66. The second bracket 65 is made of steel, for example, stainless steel.

A grommet 62 is coupled to the attachment hole 66 of the second bracket 65. Further, the second bracket 65 is fixed to the second cylinder head 15R by the upper bolt 74 and the lower bolt 73. The structure for fixing the second bracket 65 to the second cylinder head 15R is the same as the structure for fixing the first bracket 60 to the second cylinder head 15R. Thus, like or the same reference numerals are given to those components that are like or the same as the corresponding components. Such components will not be described.

The operation and advantages of the present embodiment will now be described.

In a vehicle in which the above-described vehicle front structure is employed, when an object collides with the hood from above, the hood is bent and deformed downward. Then, when the deformed hood comes into contact with the intercooler 40, the hood cannot be deformed downward from the intercooler 40. That is, as long as the intercooler 40 is not moved downward, the space in the vertical direction at the lower side of the hood that can be used as a crushable zone would be limited to the space from the hood to the intercooler 40.

Further, in the above-described embodiment, the intercooler 40 is of a water-cooling type. Thus, coolant circulates through the body 41 of the intercooler 40. Accordingly, for example, as compared to an air-cooling intercooler having air circulation gaps, the water-cooling intercooler 40 resists crushing in the vertical direction. Thus, it cannot be expected that the deformation of the intercooler 40 absorbs impact.

In the above-described embodiment, the grommets 62, which are made of synthetic rubber, are arranged between the first bracket 60 and the second bracket 65, which extend from the intercooler 40, and the second cylinder head 15R and the second head cover 20R. This structure allows force acting on the intercooler 40 from above to be delivered to the grommets 62 through the first bracket 60 and the second bracket 65. As a result, the grommet 62 is compressed in the vertical direction, and the intercooler 40 is moved downward. In this case, the hood can be deformed downward by an amount in which the intercooler 40 is moved downward. That is, the amount in which the intercooler 40 is moved downward serves as a crushable zone in the vertical direction in the engine compartment. Thus, as compared to a structure without the grommets 62 in which the intercooler 40 is not moved downward, the crushable zone is large in the vertical direction in the engine compartment. This sufficiently absorbs impact on the hood from above.

Additionally, in the above-described embodiment, the structure in which the elastic members are arranged between the internal combustion engine 10 and the first bracket 60 and the second bracket 65, which extend from the intercooler 40, is achieved by a simple structure using the annular grommets 62. That is, the intercooler 40 can be moved downward with a minimum design change in a conventional structure such as addition of grommets 62 or change in the shape of dimension of the attachment holes 61 and 66 of the first and second brackets 60 and 65. This limits an increase in the cost resulting from the application of the grommets 62 and makes the manufacturing process less complicated.

The downstream intake pipe 46 extends from the intercooler 40 and is connected to the intake manifold 30. That is, the intercooler 40 is supported by the intake manifold 30 (internal combustion engine 10) via the downstream intake pipe 46. In this case, if the downstream intake pipe 46 has a high rigidity and thus resists deforming, the intercooler 40 resists being moved downward. Particularly, in the V-type internal combustion engine 10, the intercooler 40 is arranged above the intake manifold 30. Thus, the distance between the intake manifold 30 and the intercooler 40 is short. In this case, the length of the downstream intake pipe 46 is small. Thus, the downstream intake pipe 46 resists bending and deforming.

In the above-described embodiment, the downstream pipe 46B of the downstream intake pipe 46 is made of synthetic plastic. Thus, as compared to when the entire downstream intake pipe 46 is made of steel, the downstream intake pipe 46 is easily bent and deformed. This prevents the downstream intake pipe 46 from limiting downward movement of the intercooler 40.

Further, the first upstream intake pipe 45L and the second upstream intake pipe 45R extend from the intercooler 40. The first upstream intake pipe 45L is connected to the first turbocharger 50L, and the second upstream intake pipe 45R is connected to the second turbocharger 50R. That is, the intercooler 40 is fixed to the cylinder block 11 by the first upstream intake pipe 45L and the first turbocharger 50L and by the second upstream intake pipe 45R and the second turbocharger 50R. Thus, in the same manner as the downstream intake pipe 46, when the first upstream intake pipe 45L and the second upstream intake pipe 45R have a high rigidity, the intercooler 40 resists being moved downward.

In the above-described embodiment, the downstream pipes 45A, the middle upstream pipes 45C, and the upstream pipes 45D of the first upstream intake pipe 45L and the second upstream intake pipe 45R are made of synthetic plastic or synthetic rubber. Thus, as compared to when the entire first upstream intake pipe 45L and the entire second upstream intake pipe 45R are made of steel, the downstream pipes 45A, the middle upstream pipes 45C, and the upstream pipes 45D are bent and deformed easily.

Particularly, each of the downstream pipes 45A, which configures portions of the first upstream intake pipe 45L and the second upstream intake pipe 45R, extends in the first direction corresponding to the axial direction of the crankshaft 25, which is orthogonal to the vertical direction. In this case, during movement of the intercooler 40, the downstream pipe 45A is easily bent and deformed. In addition, the downstream pipe 45A is made of synthetic rubber, which has a relatively small rigidity. Thus, the intercooler 40 can be moved downward in a suitable manner.

The present embodiment may be modified as follows. The present embodiment and the following modifications can be combined as long as the combined modifications remain technically consistent with each other.

The internal combustion engine 10 is not limited to a V-type engine. For example, the above-described structure for fixing the intercooler 40 may be applied to an internal combustion engine in which multiple cylinders are arranged in series. Further, there may be any number of the cylinders 12 in the internal combustion engine. In the internal combustion engine in which the cylinders 12 are arranged in series, the intake manifold is arranged in the proximity of the side surface of the internal combustion engine. Thus, in some cases, the intercooler 40 is not arranged above the intake manifold.

Instead of the first turbocharger 50L and the second turbocharger 50R, a supercharger in which the compressor wheel is rotated by an electric motor may be employed.

The shape of, for example, the body 41 of the intercooler 40 may be changed, for example, based on the space in the engine compartment and based on how other members are fixed to each other.

The intercooler 40 may be coupled to the internal combustion engine 10 with a component that differs from the first bracket 60 and the second bracket 65. For example, a tubular boss extending from the outer surface of the intercooler 40 and a bolt inserted through the boss may be used to couple the intercooler 40 to the internal combustion engine 10. In this case, the boss corresponds to the attachment body extending from the intercooler 40. Thus, as long as a component extends from the intercooler 40 to the internal combustion engine 10 and has strength enough to support the intercooler 40, the component can serve as the attachment body regardless of its shape.

Instead of the annular grommet 62, other elastic members may be used. For example, a plate-shaped elastic member may be arranged between the lower surface of the first bracket 60 and the upper surface of the head 73B of the lower bolt 73.

The grommet 62 does not have to be made of synthetic rubber and may be made of natural rubber or synthetic plastic. Further, the material of the grommet 62 may be metal as long as it has a smaller Young's modulus than the material of the first bracket 60. When the material of the grommet 62 has a smaller Young's modulus than the material of the first bracket 60, the intercooler 40 is easily moved downward by the arrangement of the grommet 62.

Instead of or in addition to arranging the grommet 62, which serves as an elastic member, on the first bracket 60, elastic members may be arranged between other portions. For example, a grommet may be arranged between the upper surface of the second head cover 20R and the lower end of the head of the lower bolt 73. Thus, when at least one elastic member is arranged between members located from the first bracket 60 and the second head cover 20R, the intercooler 40 can be moved downward.

The first bracket 60 and the internal combustion engine 10 do not have to be fixed using the lower bolt 73 and the upper bolt 74. For example, the lower bolt 73 may be omitted, and the upper bolt 74 may be fastened to the boss 71 of the second cylinder head 15R. In this case, the grommet 62 is located between the first bracket 60 and the second head cover 20R.

Additionally, the first bracket 60 and the internal combustion engine 10 do not have to be fixed to each other using bolts. For example, adhesive may be used to fix the grommet 62 to the second head cover 20R as long as the necessary strength is obtained.

The grommet 62 (elastic member) does not have to be arranged between the intercooler 40 and the internal combustion engine 10 at all the fixing sections. For example, one of the grommet 62 of the first bracket 60 and the grommet 62 of the second bracket 65 may be omitted. Alternatively, the grommet 62 may be arranged only at the fixing sections on one of the first bank and the second bank of the intercooler 40.

The intercooler 40 may be an air-cooling intercooler. The air-cooling intercooler needs to include a duct through which air is drawn into the intercooler and air is discharged. In this case, the duct is located between the hood and the air-cooling intercooler. Thus, the hood resists deforming downward. Even in this structure, the above-described structure in which the intercooler can be moved downward may be employed.

The entire downstream intake pipe 46 may be made of metal such as steel. Even if the entire downstream intake pipe 46 is made of steel, as long as the length of downstream intake pipe 46 is sufficiently long and the wall thickness is small, the downstream intake pipe 46 can be bent and the intercooler 40 can be moved downward. In the same manner, the first upstream intake pipe 45L and the second upstream intake pipe 45R may be entirely made of metal such as steel.

The downstream intake pipe 46 may be configured by a single monolithic tubular member. Alternatively, three or more tubular members may be connected to one another to configure the downstream intake pipe 46. Further, to move the intercooler 40 downward, it is preferred that at least a part of the downstream intake pipe 46 be made of synthetic plastic or rubber. In the same manner, the first upstream intake pipe 45L and the second upstream intake pipe 45R may be configured by one, two, or three integral tubular members. Alternatively, five or more tubular members may be connected to one another to configure the first upstream intake pipe 45L and the second upstream intake pipe 45R.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle front structure in which an intercooler for cooling intake air is arranged above an internal combustion engine in an engine compartment, the vehicle front structure comprising:
    an attachment body extending from the intercooler; and
    an elastic member arranged between the attachment body and the internal combustion engine, wherein
    the intercooler is coupled to the internal combustion engine by the attachment body, and
    a material of the elastic member has a lower Young's modulus than a material of the attachment body.

2. The vehicle front structure according to claim 1, wherein
    the internal combustion engine is an internal combustion engine in which a cylinder in a first bank and a cylinder in a second bank are laid out to configure a V-shaped arrangement,
    an intake manifold that supplies the cylinder with intake air is arranged between a cylinder head on the first bank and a cylinder head on the second bank,
    the intercooler is arranged above the intake manifold,
    the intercooler is connected to a downstream intake pipe through which intake air cooled in the intercooler is drawn into the intake manifold, and
    at least a part of the downstream intake pipe in a longitudinal direction is made of synthetic plastic or rubber.

3. The vehicle front structure according to claim 1, wherein
    the intercooler is connected to an upstream intake pipe through which intake air forcibly delivered by a forced-induction device is drawn into the intercooler,
    a part of the upstream intake pipe extends in a direction that is orthogonal to a vertical direction of the internal combustion engine, and
    a part of the upstream intake pipe is made of synthetic plastic or rubber.

4. The vehicle front structure according to claim 1, wherein
    the attachment body is a plate-shaped bracket,
    the bracket has an attachment hole extending in a thickness direction of the bracket,
    the elastic member is an annular grommet,
    an outer circumferential surface of the grommet has a groove recessed inward in a radial direction,
    the groove extends entirely in a circumferential direction of the grommet, the grommet is fitted into the attachment hole of the bracket such that an inner edge of the attachment hole is located in the groove, and
    a bolt inserted through the grommet fixes the intercooler to the internal combustion engine with the bracket.

5. The vehicle front structure according to claim 1, wherein the intercooler is a water-cooling intercooler, coolant being supplied into the intercooler.

* * * * *